(12) United States Patent
Natanzon

(10) Patent No.: US 8,583,885 B1
(45) Date of Patent: Nov. 12, 2013

(54) ENERGY EFFICIENT SYNC AND ASYNC REPLICATION

(75) Inventor: Assaf Natanzon, Ramat-Gan (IL)

(73) Assignee: EMC Corporation, Hopkinton, MA (US)

(*) Notice: Subject to any disclaimer, the term of this patent is extended or adjusted under 35 U.S.C. 154(b) by 934 days.

(21) Appl. No.: 12/628,473

(22) Filed: Dec. 1, 2009

(51) Int. Cl.
*G06F 12/00* (2006.01)

(52) U.S. Cl.
USPC .......................................... 711/162; 713/324

(58) Field of Classification Search
None
See application file for complete search history.

(56) References Cited

U.S. PATENT DOCUMENTS

| | | | | |
|---|---|---|---|---|
| 5,961,613 | A * | 10/1999 | DeNicola | 710/18 |
| 7,143,254 | B2 * | 11/2006 | Suishu et al. | 711/162 |
| 7,356,657 | B2 * | 4/2008 | Mikami | 711/161 |
| 7,564,639 | B2 * | 7/2009 | Korst et al. | 360/69 |
| 7,987,318 | B2 * | 7/2011 | Hetzler et al. | 711/114 |
| 2005/0240584 | A1 * | 10/2005 | Patterson et al. | 707/8 |
| 2007/0061509 | A1 * | 3/2007 | Ahluwalia et al. | 711/112 |
| 2007/0192552 | A1 * | 8/2007 | Dutta et al. | 711/162 |
| 2010/0058011 | A1 * | 3/2010 | Satoyama et al. | 711/162 |
| 2010/0238574 | A1 * | 9/2010 | Balasubramanian | 360/15 |

* cited by examiner

*Primary Examiner* — Hiep Nguyen
(74) *Attorney, Agent, or Firm* — Krishnendu Gupta; Joseph D'Angelo

(57) ABSTRACT

A method, system and program product for managing data replication in a data replication system, the data replication system comprising a journal and a plurality of spindles configured to store a plurality of Logic Unit Numbers (LUN), the method comprising selecting a LUN of the LUNs to store journal I/O data from the data replication, wherein the selected LUN is configured to be a subset of the plurality of spindles, spinning down the spindles not configured to store the selected LUN, recording journal I/O on the selected LUN, determining to distribute the journal IO from the selected LUN disk to the non-selected LUNs, spinning up the spindles storing the non-selected LUNs, and distributing the journal I/O from the determined disks to the other LUNs.

21 Claims, 9 Drawing Sheets

ENERGY EFFICIENT SYNC AND ASYNC REPLICATION

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This invention relates to data replication.

BACKGROUND

Computer data is vital to today's organizations, and a significant part of protection against disasters is focused on data protection. As solid-state memory has advanced to the point where cost of memory has become a relatively insignificant factor, organizations may afford to operate with systems that store and process terabytes of data.

Conventional data protection systems include tape backup drives, for storing organizational production site data on a periodic basis. Such systems suffer from several drawbacks. First, they require a system shutdown during backup, since the data being backed up cannot be used during the backup operation. Second, they limit the points in time to which the production site may recover. For example, if data is backed up on a daily basis, there may be several hours of lost data in the event of a disaster. Third, the data recovery process itself takes a long time.

Another conventional data protection system uses data replication, by creating a copy of the organization's production site data on a secondary backup storage system, and updating the backup with changes. The backup storage system may be situated in the same physical location as the production storage system, or in a physically remote location. Data replication systems generally operate either at the application level, at the file system level, or at the data block level.

Current data protection systems try to provide continuous data protection, which enable the organization to roll back to any specified point in time within a recent history. Continuous data protection systems aim to satisfy two conflicting objectives, as best as possible; namely, (i) minimize the down time, in which the organization production site data is unavailable, during a recovery, and (ii) enable recovery as close as possible to any specified point in time within a recent history.

Continuous data protection typically uses a technology referred to as "journaling," whereby a log is kept of changes made to the backup storage. During a recovery, the journal entries serve as successive "undo" information, enabling rollback of the backup storage to previous points in time. Journaling was first implemented in database systems, and was later extended to broader data protection.

One challenge to continuous data protection is the ability of a backup site to keep pace with the data transactions of a production site, without slowing down the production site. The overhead of journaling inherently requires several data transactions at the backup site for each data transaction at the production site. As such, when data transactions occur at a high rate at the production site, the backup site may not be able to finish backing up one data transaction before the next production site data transaction occurs. If the production site is not forced to slow down, then necessarily a backlog of un-logged data transactions may build up at the backup site. Without being able to satisfactorily adapt dynamically to changing data transaction rates, a continuous data protection system chokes and eventually forces the production site to shut down.

SUMMARY

A method, system and program product for managing data replication in a data replication system, the data replication system comprising a journal and a plurality of spindles configured to store a plurality of Logic Unit Numbers (LUN), the method comprising selecting a LUN of the LUNs to store journal I/O data from the data replication, wherein the selected LUN is configured to be a subset of the plurality of spindles, spinning down the spindles not configured to store the selected LUN, recording journal I/O on the selected LUN, determining to distribute the journal IO from the selected LUN disk to the non-selected LUNs, spinning up the spindles storing the non-selected LUNs, and distributing the journal I/O from the determined disks to the other LUNs.

DESCRIPTION OF DRAWINGS

The above and further advantages of the present invention may be better under stood by referring to the following description taken into conjunction with the accompanying drawings in which.

DETAILED DESCRIPTION

Figure 1:
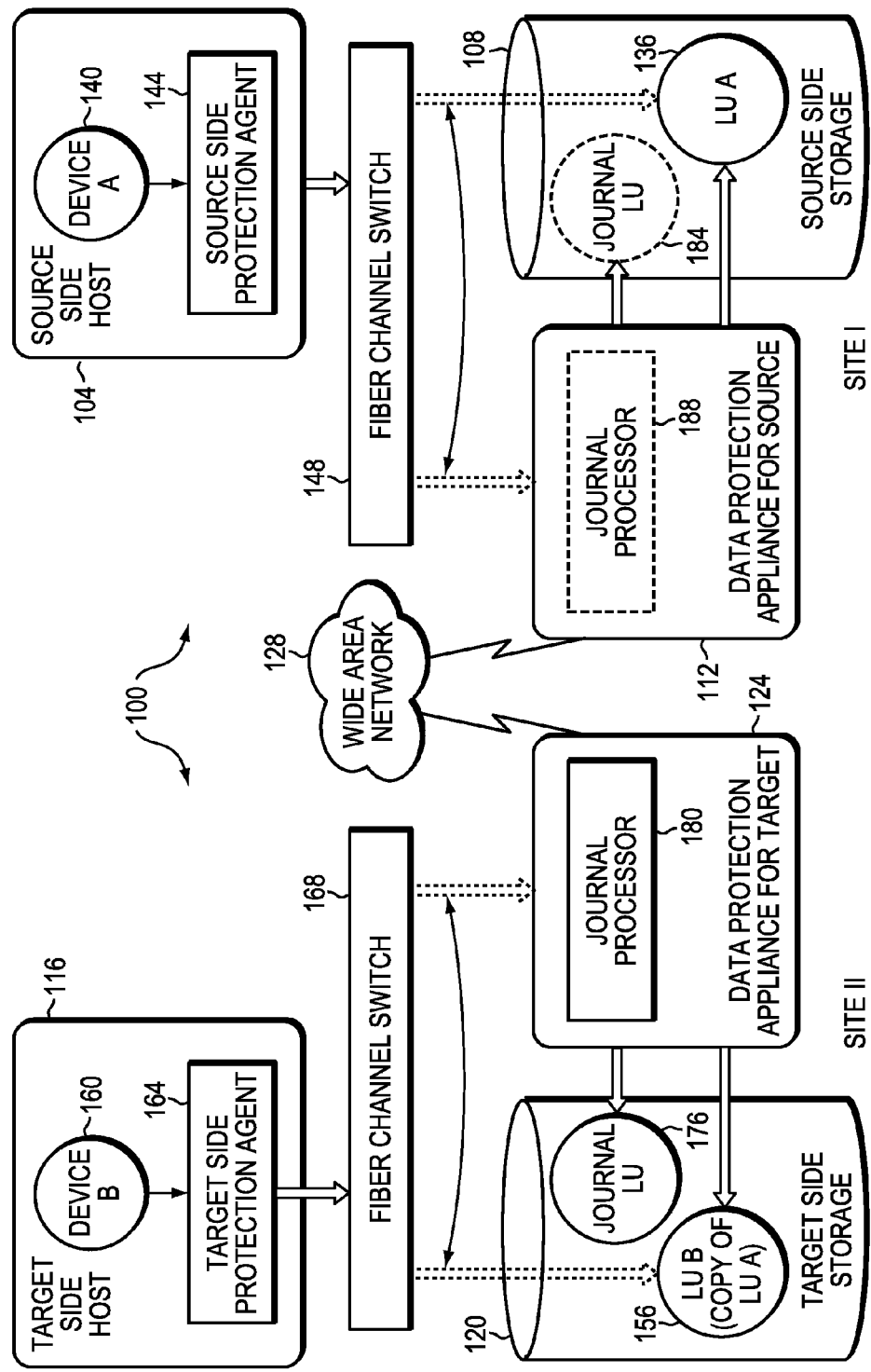
FIG. 1 is a simplified block diagram of a data protection system, in accordance with an embodiment of the present invention.

Techniques of an embodiment of the current invention provide for an energy efficient means of controlling data replication. In an embodiment, replication may be controlled to enable replication to occur when it is more energy efficient. For example, an embodiment of the current techniques may leverage a recover point replication and use sync/async replication with a journal and to create a spin down scheduler. This may allow the user volumes to be spun down for most day, while I/Os may be recorded in a journal on a different volume, and the user volumes may be turned on at time when energy costs are less to finish replication.

In an embodiment of the current techniques, a journal may be kept to record I/O for a given system. In this embodiment, since the IOs to the journal are sequential, there may not be a need to keep the journal on many spindles. That is, the journal may be located on a drive or a handful of drives (spindles) which may hold all I/Os. This may allow the other drives to be spun down as I/Os are collected. Then, when energy costs have decreased, the rest of the drives may be spun up for distribution of the journal moving data from the do streams to the undo streams and updating the user volumes. Further this may occur when replicating synchronously. This would enable the majority of the drives in a replication system to be spun down during the time when energy costs more and only spun up to accept distributions from the journal when energy costs have decreased, such as at night.

Often, power supply rates are tiered based on when the usage is to occur. Typically during peak times, such as during daylight hours, the cost to use electricity is higher. As well, during conventional off-peak hours, such as at night, the cost to use electricity may be less. However, typical data replication solutions have not taken advantage of the different cost of power, instead replicating data when it occurred. The energy saving may also occur when electricity rates are flat, since even then most of the drives will be spun down during large portions of the day (depending on the TO rate incoming from the production site, which will determine the amount of resources needed to distribute data at the replica site).

There is additionally provided in accordance with an embodiment of the present invention a computer-readable storage medium storing program code for causing a computing device to receive a plurality of write transactions from a data production site, for application at a data backup site, select one of a plurality of journaling processes based on at least one processing state transition rule, wherein each of the plurality of journaling processes controls the queuing, recording and application of write transactions received at the backup site, and wherein each of the at least one processing state transition rule relates directly or indirectly to rates of incoming write transactions at the data backup site, temporarily queue write transactions at the backup site within a queue, in accordance with the selected journaling process, record write transactions at the backup site, for data recovery purposes, in accordance with the selected journaling process, and apply the write transactions at the backup site, in accordance with the selected journaling process.

The following definitions may be useful in understanding the specification and claims.

REPLICA SITE—a facility where replicated production site data is stored; the replica site may be located in a remote site or at the same location as the production site;

DPA—a computer or a cluster of computers that serve as a data protection appliance, responsible for data protection services including inter alia data replication of a storage system, and journaling of I/O requests issued by a host computer to the storage system;

HOST—at least one computer or networks of computers that runs at least one data processing application that issues I/O requests to one or more storage systems; a host is an initiator with a SAN;

HOST DEVICE—an internal interface in a host, to a logical storage unit;

IMAGE—a copy of a logical storage unit at a specific point in time;

INITIATOR—a node in a SAN that issues I/O requests;

JOURNAL—a record of write transactions issued to a storage system; used to maintain a duplicate storage system, and to rollback the duplicate storage system to a previous point in time;

LOGICAL UNIT (LU)—a logical entity provided by a storage system for accessing data from the storage system;

LUN—a logical unit number for identifying a logical unit;

MAID—Massive array of Idle Disks;

PHYSICAL STORAGE UNIT—a physical entity, such as a disk or an array of disks, for storing data in storage locations that can be accessed by address;

PRODUCTION SITE—a facility where one or more host computers run data processing applications that write data to a storage system and read data from the storage system;

SAN—a storage area network of nodes that send and receive I/O and other requests, each node in the network being an initiator or a target, or both an initiator and a target;

SOURCE SIDE—a transmitter of data within a data replication workflow, during normal operation a production site is the source side; and during data recovery a backup site is the source side;

SPINDLE—may be a physical disk;

STORAGE SYSTEM—a SAN entity that provides multiple logical units for access by multiple SAN initiators TARGET—a node in a SAN that replies to I/O requests;

TARGET SIDE—a receiver of data within a data replication workflow; during normal operation a back site is the target side, and during data recovery a production site is the target side;

WAN—a wide area network that connects local networks and enables them to communicate with one another, such as the Internet.

Herein, the word spindle may be used to refer to a physical disk, and a LUN as noted above, may refer to a logical mapping. A LUN may be mapped to a single disk or spindle, or may be mapped across several spindles or disks.

A description of journaling and some techniques associated with journaling may be described in the patent titled METHODS AND APPARATUS FOR OPTIMAL JOURNALING FOR CONTINUOUS DATA REPLICATION and with U.S. Pat. No. 7,516,287, which is hereby incorporated by reference.

Embodiment of a Replication System

Reference is now made to FIG. 1, which is a simplified illustration of an embodiment of data protection system 100, in accordance with an embodiment of the present invention. Shown in FIG. 1 are two sites; Site I, which is a production site, on the right, and Site II, which is a backup site, on the left. Under normal operation the production site is the source side of system 100, and the backup site is the target side of the system. The backup site is responsible for replicating production site data, herein the backup site may be referred to as the replication site. Additionally, the replica site enables rollback of Site I data to an earlier pointing time, which may be used in the event of data corruption of a disaster, or alternatively in order to view or to access data from an earlier point in time.

During normal operations, the direction of replicate data flow goes from source side to target side. It is possible, however, for a user to reverse the direction of replicate data flow, in which case Site I starts to behave as a target backup site, and Site II starts to behave as a source production site. Such change of replication direction is referred to as a "failover". A failover may be performed in the event of a disaster at the production site, or for other reasons. In some data architectures, Site I or Site II behaves as a production site for a portion of stored data, and behaves simultaneously as a backup site for another portion of stored data. In some data architectures, a portion of stored data is replicated to a backup site, and another portion is not.

The production site and the replica site may be remote from one another, or they may both be situated at a common site, local to one another. Local data protection has the advantage of minimizing data lag between target and source, and remote data protection has the advantage is being robust in the event that a disaster occurs at the source side.

The source and target sides communicate via a wide area network (WAN) 128, although other types of networks are also adaptable for use with the present invention.

In accordance with an embodiment of the present invention, each side of system 100 includes three major components coupled via a storage area network (SAN); namely, (i) a storage system, (ii) a host computer, and (iii) a data protection appliance (DPA). Specifically with reference to FIG. 1, the source side SAN includes a source host computer 104, a source storage system 108, and a source DPA 112. Similarly, the target side SAN includes a target host computer 116, a target storage system 120, and a target DPA 124.

Generally, a SAN includes one or more devices, referred to as "nodes". A node in a SAN may be an "initiator" or a "target", or both. An initiator node is a device that is able to initiate requests to one or more other devices; and a target node is a device that is able to reply to requests, such as SCSI commands, sent by an initiator node. A SAN may also include network switches, such as fiber channel switches. The communication links between each host computer and its corresponding storage system may be any appropriate medium suitable for data transfer, such as fiber communication channel links.

In an embodiment of the present invention, the host communicates with its corresponding storage system using small computer system interface (SCSI) commands.

System 100 includes source storage system 108 and target storage system 120. Each storage system includes physical storage units for storing data, such as disks or arrays of disks. Typically, storage systems 108 and 120 are target nodes. In order to enable initiators to send requests to storage system 108, storage system 108 exposes one or more logical units (LU) to which commands are issued. Thus, storage systems 108 and 120 are SAN entities that provide multiple logical units for access by multiple SAN initiators.

Logical units are a logical entity provided by a storage system, for accessing data stored in the storage system. A logical unit is identified by a unique logical unit number (LUN). In an embodiment of the present invention, storage system 108 exposes a logical unit 136, designated as LU A, and storage system 120 exposes a logical unit 156, designated as LU B.

In an embodiment of the present invention, LU B is used for replicating LU A. As such, LU B is generated as a copy of LU A. In one embodiment, LU B is configured so that its size is identical to the size of LU A. Thus for LU A, storage system 120 serves as a replica for source side storage system 108. Alternatively, as mentioned hereinabove, some logical units of storage system 120 may be used to back up logical units of storage system 108, and other logical units of storage system 120 may be used for other purposes. Moreover, in certain embodiments of the present invention, there is symmetric replication whereby some logical units of storage system 108 are used for replicating logical units of storage system 120, and other logical units of storage system 120 are used for replicating other logical units of storage system 108.

System 100 includes a source side host computer 104 and a target side host computer 116. A host computer may be one computer, or a plurality of computers, or a network of distributed computers, each computer may include inter alia a conventional CPU, volatile and non-volatile memory, a data bus, an I/O interface, a display interface and a network interface. Generally a host computer runs at least one data processing application, such as a database application and an e-mail server.

Generally, an operating system of a host computer creates a host device for each logical unit exposed by a storage system in the host computer SAN. A host device may be a logical entity in a host computer, through which a host computer may access a logical unit. In an embodiment of the present invention, host device 104 identifies LU A and generates a corresponding host device 140, designated as Device A, through which it can access LU A. Similarly, host computer 116 identifies LU B and generates a corresponding device 160, designated as Device B.

In an embodiment of the present invention, in the course of continuous operation, host computer 104 is a SAN initiator that issues I/O requests (write/read operations) through host device 140 to LU A using, for example, SCSI commands. Such requests are generally transmitted to LU A with an address that includes a specific device identifier, an offset within the device, and a data size. Offsets are generally aligned to 512 byte blocks. The average size of a write operation issued by host computer 104 may be, for example, 10 kilobytes (KB); i.e., 20 blocks. For an I/O rate of 50 megabytes (MB) per second, this corresponds to approximately 5,000 write transactions per second.

System 100 includes two data protection appliances, a source side DPA 112 and a target side DPA 124. A DPA performs various data protection services, such as data replication of a storage system, and journaling of I/O requests issued by a host computer to source side storage system data. As explained in detail hereinbelow, when acting as a target side DPA, a DPA may also enable rollback of data to an earlier point in time, and processing of rolled back data at the target site. Each DPA 112 and 124 is a computer that includes inter alia one or more conventional CPUs and internal memory.

For additional safety precaution, each DPA is a cluster of such computers. Use of a cluster ensures that if a DPA computer is down, then the DPA functionality switches over to another computer. The DPA computers within a DPA cluster communicate with one another using at least one communication link suitable for data transfer via fiber channel or IP based protocols, or such other transfer protocol. One computer from the DPA cluster serves as the DPA leader. The DPA cluster leader coordinates between the computers in the cluster, and may also perform other tasks that require coordination between the computers, such as load balancing.

In the architecture illustrated in FIG. 1, DPA 112 and DPA 124 are standalone devices integrated within a SAN. Alternatively, each of DPA 112 and DPA 124 may be integrated into storage system 108 and storage system 120, respectively, or integrated into host computer 104 and host computer 116, respectively. Both DPAs communicate with their respective host computers through communication lines such as fiber channels using, for example, SCSI commands.

In accordance with an embodiment of the present invention, DPAs 112 and 124 are configured to act as initiators in the SAN; i.e., they can issue I/O requests using, for example, SCSI commands, to access logical units on their respective storage systems. DPA 112 and DPA 124 are also configured with the necessary functionality to act as targets; i.e., to reply to I/O requests, such as SCSI commands, issued by other initiators in the SAN, including inter alia their respective host computers 104 and 116. Being target nodes, DPA 112 and DPA 124 may dynamically expose or remove one or more logical units.

As described hereinabove, Site I and Site II may each behave simultaneously as a production site and a backup site for different logical units. As such, DPA 112 and DPA 124 may each behave as a source DPA for some logical units, and as a target DPA for other logical units, at the same time.

In accordance with an embodiment of the present invention, host computer 104 and host computer 116 include protection agents 144 and 164, respectively. Protection agents 144 and 164 intercept SCSI commands issued by their respective host computers, via host devices to logical units that are accessible to the host computers. In accordance with an embodiment of the present invention, a data protection agent may act on an intercepted SCSI commands issued to a logical unit, in one of the following ways:

Send the SCSI commands to its intended logical unit.
Redirect the SCSI command to another logical unit.
Split the SCSI command by sending it first to the respective DPA. After the DPA returns an acknowledgement, send the SCSI command to its intended logical unit.
Fail a SCSI command by returning an error return code.
Delay a SCSI command by not returning an acknowledgement to the respective host computer.

A protection agent may handle different SCSI commands, differently, according to the type of the command. For example, a SCSI command inquiring about the size of a certain logical unit may be sent directly to that logical unit, while a SCSI write command may be split and sent first to a DPA associated with the agent. A protection agent may also change its behavior for handling SCSI commands, for example as a result of an instruction received from the DPA.

Specifically, the behavior of a protection agent for a certain host device generally corresponds to the behavior of its associated DPA with respect to the logical unit of the host device. When a DPA behaves as a source site DPA for a certain logical unit, then during normal course of operation, the associated protection agent splits I/O requests issued by a host computer to the host device corresponding to that logical unit. Similarly, when a DPA behaves as a target device for a certain logical unit, then during normal course of operation, the associated protection agent fails I/O requests issued by host computer to the host device corresponding to that logical unit.

Communication between protection agents and their respective DPAs may use any protocol suitable for data transfer within a SAN, such as fiber channel, or SCSI over fiber channel. The communication may be direct, or via a logical unit exposed by the DPA. In an embodiment of the present invention, protection agents communicate with their respective DPAs by sending SCSI commands over fiber channel.

In an embodiment of the present invention, protection agents 144 and 164 are drivers located in their respective host computers 104 and 116. Alternatively, a protection agent may also be located in a fiber channel switch, or in any other device situated in a data path between a host computer and a storage system.

What follows is a detailed description of system behavior under normal production mode, and under recovery mode.

In accordance with an embodiment of the present invention, in production mode DPA 112 acts as a source site DPA for LU A. Thus, protection agent 144 is configured to act as a source side protection agent; i.e., as a splitter for host device A. Specifically, protection agent 144 replicates SCSI I/O requests. A replicated SCSI I/O request is sent to DPA 112. After receiving an acknowledgement from DPA 124, protection agent 144 then sends the SCSI I/O request to LU A. Only after receiving a second acknowledgement from storage system 108 will host computer 104 initiate another I/O request.

When DPA 112 receives a replicated SCSI write request from data protection agent 144, DPA 112 transmits certain I/O information characterizing the write request, packaged as a "write transaction", over WAN 128 to DPA 124 on the target side, for journaling and for incorporation within target storage system 120.

DPA 112 may send its write transactions to DPA 124 using a variety of modes of transmission, including inter alia (i) a synchronous mode, (ii) an asynchronous mode, and (iii) a snapshot mode. In synchronous mode, DPA 112 sends each write transaction to DPA 124, receives back an acknowledgement from DPA 124, and in turns sends an acknowledgement back to protection agent 144. Protection agent 144 waits until receipt of such acknowledgement before sending the SCSI write request to LU A.

In asynchronous mode, DPA 112 sends an acknowledgement to protection agent 144 upon receipt of each I/O request, before receiving an acknowledgement back from DPA 124.

In snapshot mode, DPA 112 receives several I/O requests and combines them into an aggregate "snapshot" of all write activity performed in the multiple I/O requests, and sends the snapshot to DPA 124, for journaling and for incorporation in target storage system 120. In snapshot mode DPA 112 also sends an acknowledgement to protection agent 144 upon receipt of each I/O request, before receiving an acknowledgement back from DPA 124.

For the sake of clarity, the ensuing discussion assumes that information is transmitted at write-by-write granularity.

While in production mode, DPA 124 receives replicated data of LU A from DPA 112, and performs journaling and writing to storage system 120. When applying write operations to storage system 120, DPA 124 acts as an initiator, and sends SCSI commands to LU B.

During a recovery mode, DPA 124 undoes the write transactions in the journal, so as to restore storage system 120 to the state it was at, at an earlier time.

As described hereinabove, in accordance with an embodiment of the present invention, LU B is used as a backup of LU A. As such, during normal production mode, while data written to LU A by host computer 104 is replicated from LU A to LU B, host computer 116 should not be sending I/O requests to LU B. To prevent such I/O requests from being sent, protection agent 164 acts as a target site protection agent for host Device B and fails I/O requests sent from host computer 116 to LU B through host Device B.

In accordance with an embodiment of the present invention, target storage system 120 exposes a logical unit 176, referred to as a "journal LU", for maintaining a history of write transactions made to LU B, referred to as a "journal". Alternatively, journal LU 176 may be striped over several logical units, or may reside within all of or a portion of another logical unit. DPA 124 includes a journal processor 180 for managing the journal.

Journal processor 180 functions generally to manage the journal entries of LU B. Specifically, journal processor 180 (i) enters write transactions received by DPA 124 from DPA 112 into the journal, by writing them into the journal LU, (ii) applies the journal transactions to LU B, and (iii) updates the journal entries in the journal LU with undo information and removes already-applied transactions from the journal. As described below, with reference to FIGS. 2 and 3A-3D, journal entries include four streams, two of which are written when write transaction are entered into the journal, and two of which are written when write transaction are applied and removed from the journal.

Figure 2:
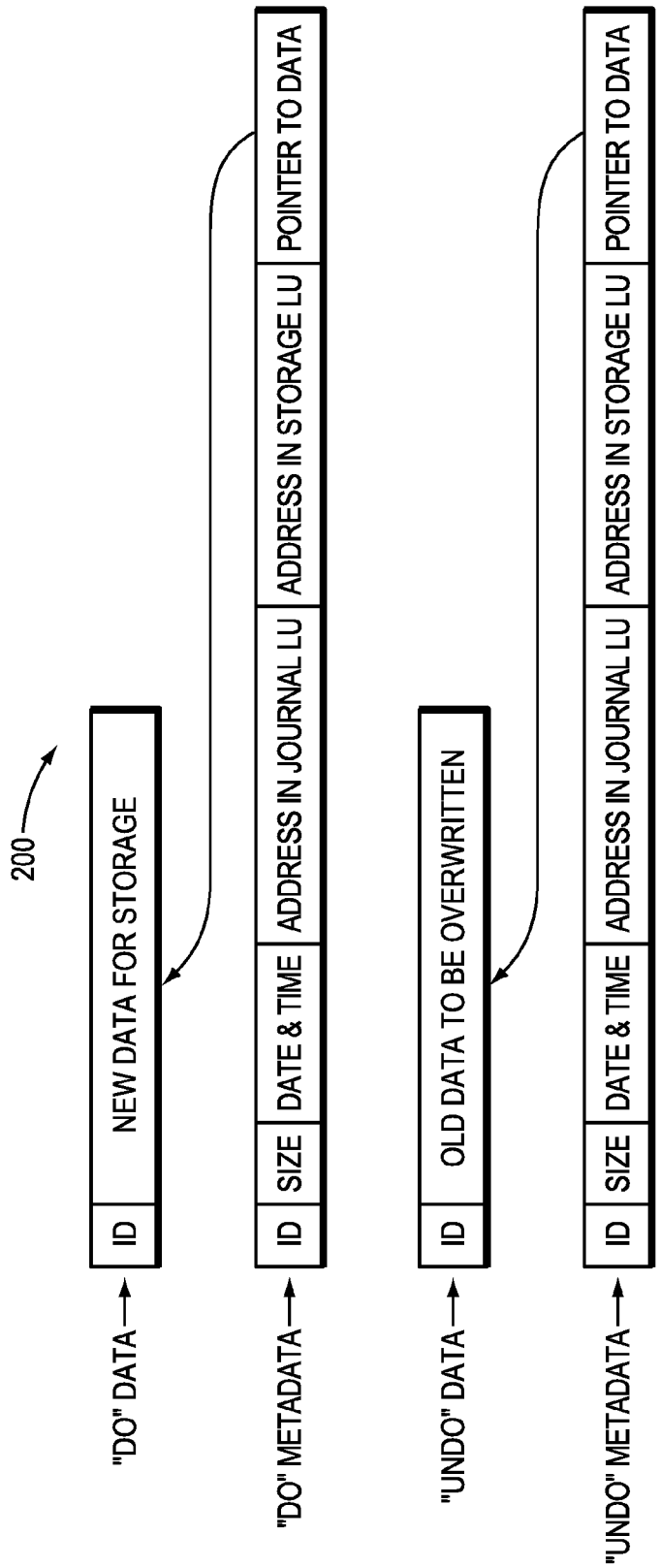
FIG. 2 is a simplified illustration of a journal history of write transactions for a storage system, in accordance with an embodiment of the present invention.

Reference is now made to FIG. 2, which is a simplified illustration of a write transaction 200 for a journal, in accordance with an embodiment of the present invention. The journal may be used to provide an adaptor for access to storage 120 at the state it was in at any specified point in time. Since the journal contains the "undo" information necessary to rollback storage system 120, data that was stored in specific memory locations at the specified point in time may be obtained by undoing write transactions that occurred subsequent to such point in time.

Write transaction 200 generally includes the following fields:
one or more identifiers;
a time stamp, which is the date & time at which the transaction was received by source side DPA 112;
a write size, which is the size of the data block;
a location in journal LU 176 where the data is entered;
a location in LU B where the data is to be written; and
the data itself.

Write transaction 200 is transmitted from source side DPA 112 to target side DPA 124. As shown in FIG. 2, DPA 124 records the write transaction 200 in four streams. A first stream, referred to as a DO stream, includes new data for writing in LU B. A second stream, referred to as an DO METADATA stream, includes metadata for the write transaction, such as an identifier, a date & time, a write size, a beginning address in LU B for writing the new data in, and a pointer to the offset in the do stream where the corresponding data is located. Similarly, a third stream, referred to as an UNDO stream, includes old data that was overwritten in LU B; and a fourth stream, referred to as an UNDO METADATA, include an identifier, a date & time, a write size, a beginning address in LU B where data was to be overwritten, and a pointer to the offset in the undo stream where the corresponding old data is located.

In practice each of the four streams holds a plurality of write transaction data. As write transactions are received dynamically by target DPA 124, they are recorded at the end of the DO stream and the end of the DO METADATA stream, prior to committing the transaction. During transaction application, when the various write transactions are applied to LU B, prior to writing the new DO data into addresses within the storage system, the older data currently located in such addresses is recorded into the UNDO stream.

By recording old data, a journal entry can be used to "undo" a write transaction. To undo a transaction, old data is read from the UNDO stream in a reverse order, from the most recent data to the oldest data, for writing into addresses within LU B. Prior to writing the UNDO data into these addresses, the newer data residing in such addresses is recorded in the DO stream.

The journal LU is partitioned into segments with a predefined size, such as 1 MB segments, with each segment identified by a counter. The collection of such segments forms a segment pool for the four journaling streams described hereinabove. Each such stream is structured as an ordered list of segments, into which the stream data is written, and includes two pointers—a beginning pointer that points to the first segment in the list and an end pointer that points to the last segment in the list.

According to a write direction for each stream, write transaction data is appended to the stream either at the end, for a forward direction, or at the beginning, for a backward direction. As each write transaction is received by DPA 124, its size is checked to determine if it can fit within available segments. If not, then one or more segments are chosen from the segment pool and appended to the stream's ordered list of segments.

Thereafter the DO data is written into the DO stream, and the pointer to the appropriate first or last segment is updated. Freeing of segments in the ordered list is performed by simply changing the beginning or the end pointer. Freed segments are returned to the segment pool for re-use.

Efficient Journal Based Replication

The journal or replicated data I/O of a source or production site may be spread across a number of drives. For example, the data may be spread across a Massive Array of IDLE Disks (MAID). As well, the journal and data may be spread across a number of spindles or LUNs. Conventionally, distribution of the data from the journal volumes to the user volumes may require that the all or a large part of the disks or MAID be spinning at any given time to accept data from the replication appliance. This may be because the journal is located on one or more LUNs and the LUNs are striped across a number of spindles or disks; as well, this may be because the I/O recorded at the journal was distributed to the user volumes immediately after it was received at the journal. Usually, this would lead to higher power costs as the MAID or many disks would continually be spinning to accommodate the writes.

An embodiment of the current invention may aggregate the journal and journal streams to be located on a subset of the spindles, such as a few dedicated spindles, or a LUN stored on one or a few spindles. The subset of the spindles may contain less than all of the spindles and may contain the LUN or LUNs which store the journal. Depending on the size and configuration of the journal and LUNs, it may be more efficient for the subset to be located on a minimal number of spindles. This may allow the spindle or spindles having the journal to continue spinning while the other spindles may be spun down. During the time the disks are spun down, the data from the journal may not be distributed to the other spindles or user volumes. At certain times, the other spindles may be spun up to receive input from and empty the do stream of the journal on the active spindle by distributing the I/O to the other user volumes stored on the other spindles. Since the journal I/Os may be sequential, the user may define the journal to reside on a LUN, located on a spindle or a few spindles. The rest of the spindles of the replica site may be spun down (i.e. the spindles of the user LUNs at the replica site which may be used as target volumes for replication and not used for the journal may be spun down).

At times, it may be beneficial to distribute the journal I/O to the other LUNS or spindles. The process of spinning up the other spindles and distributing the journal I/O may be scheduled by a scheduler. The scheduler may schedule this distribution a number of ways. For example, the scheduler may distribute the journal I/O at night, when power costs are usually lower. As well, the scheduler may have access to the power consumption rates by time of day and may schedule spin ups to minimize power costs. As well, the scheduler may spin up the other disks to distribute the data in the journal when the streams on the disk are becoming full or the scheduler may be configured by user to distribute at specific times of the day.

Figure 3:
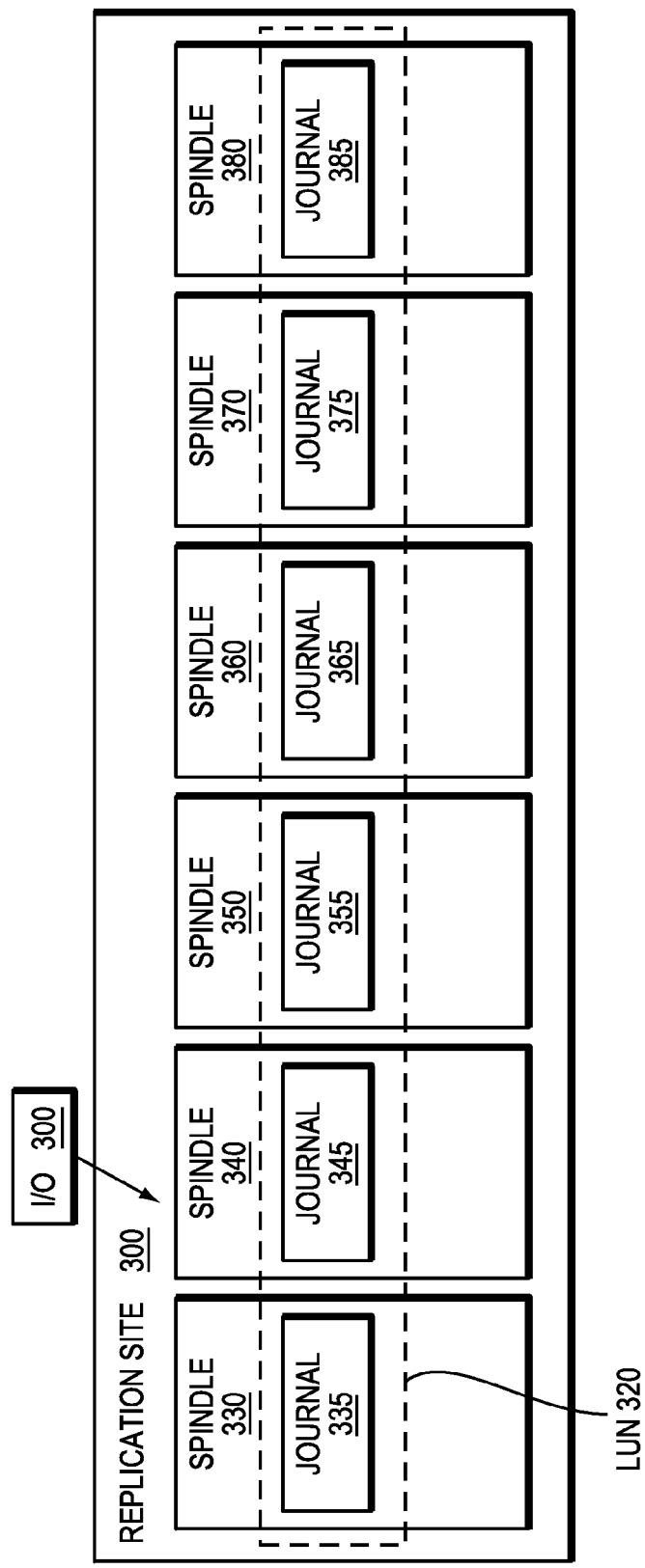
FIG. 3 is an embodiment of a simplified illustration journal spanning multiple disks.

Consider now the embodiment of a journal in FIG. 3. In this Figure, I/O 310 is being sent to a Journal on LUN 320. LUN 320 is striped across on Spindles 330, 340, 350, 360, 370, and 380 which causes pieces of the journal to be divided to be across the LUN 320. Journal pierces 335, 345, 355, 365, 375, and 385, are striped across the spindles 330, 340, 350, 360, 370, and 380. In this Figure, in order for the I/O 310 to be written to the journal, which is on LUN 320 the spindles must be spinning.

Figure 4B:
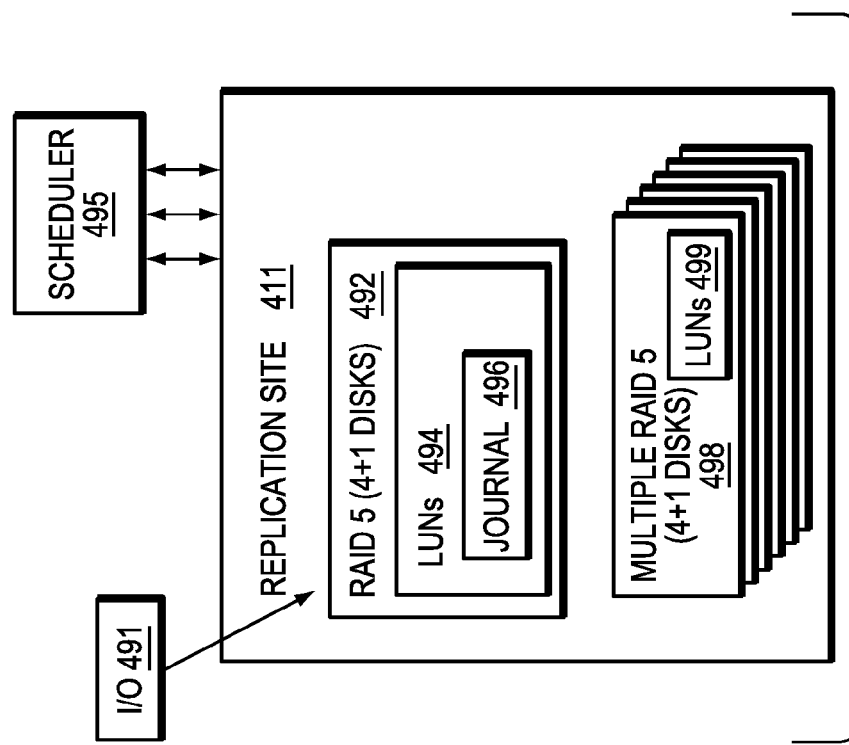
FIG. 4b is an alternative embodiment of a simplified illustration journal striped across a LUN.
Figure 4A:
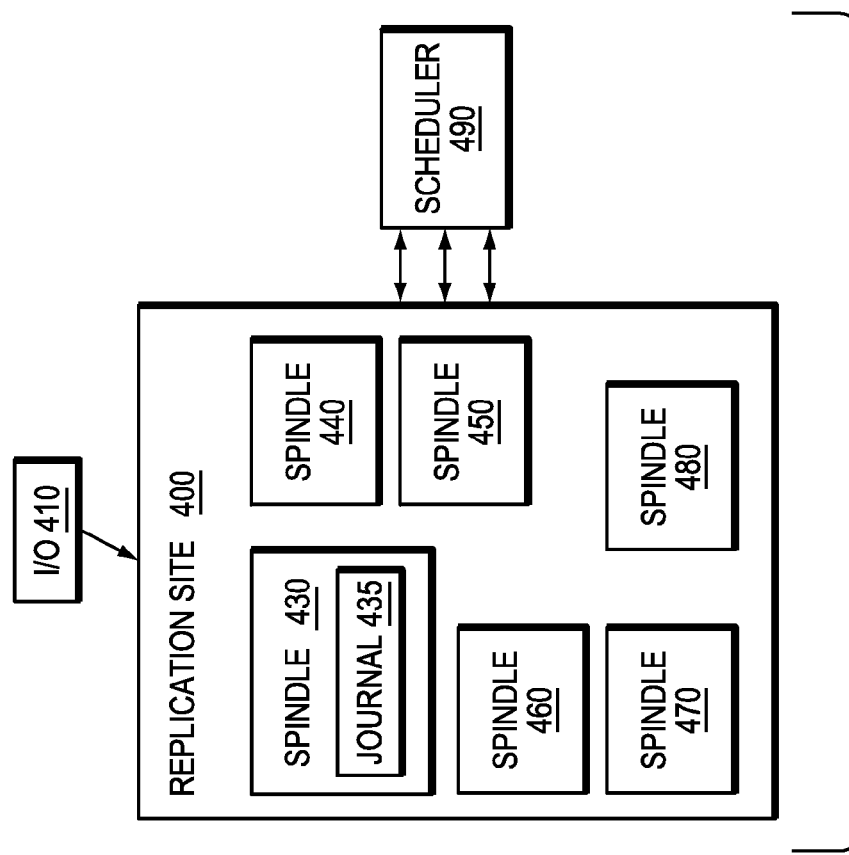
FIG. 4a is an embodiment of a simplified illustration journal spanning multiple disks being recorded on a single disk.

Conversely, take the embodiment of FIG. 4a. In FIG. 4a, I/O 410 is directed to the Journal 435. Journal 435 is located on a LUN which is located on spindle 430. In the embodiment of FIG. 4b, I/O 491 is directed to a Journal 496 striped across LUN 494. The LUN are located on Raid 5 492. Refer now to the embodiments of FIGS. 4a, 4b, and 5. In FIG. 4a, spindles 440, 450, 460, 470, and 480 have been spun down 500 and Journal 435 of disk 430 is recording all the I/O. The other spindles may be spun down as the journal, which is logging the I/O, is located on a different spindle.) In the embodiment of FIG. 4b, the disks 498 may have been spun down 500 and the disks or spindles of 492, where Journal 496 is accepting I/O 491, are spinning. The disks may have been spun down 500 by Scheduler 490 in FIG. 4a and scheduler 495 in FIG. 4b. Note that in FIG. 4a, Spindle 430 may be a single spindle or multiple spindles. In the embodiment of FIG. 4b, RAID 5 492 contains 5 drives and the LUN may be striped across all 5 of the drives or spindles.

As previously noted, in some embodiments, the journal may reside on one or more LUNs, where each LUN may use portions of one or a few spindles or disks (for example on raid 5 (4+1 disks). A RAID 5 group may be created from 5 disks, each LUN created from this raid group may use all the 5 spindles and there may be many LUNs defined on the same raid group. There are many different flavors of RAID configuration and each may be used to store the journal consistent with an embodiment.

Referring to FIG. 4b, since I/Os 491 to the journal may be sequential, the user may define the journal 496 to be striped on, for example, 2 LUNs 494, where each LUN of the LUNs 499 may contain or be defined to be from a raid 5 4+1 raid group 492. The journal 494 may serve 1000 LUs 499 defined on another 100 raid groups 498 of type raid 5 4+1, which may reside on 500 spindles (100*5). When I/O 491 is not being distributed to the 500 spindles 498, the majority of the 500 spindles 498 may be spun down by scheduler 495 while only the 10 spindles of the Raid 5 492 used by the journal 496 are spinning.

Referring to FIGS. 5 and 6a and 6b, 7 and 8, the decision 520 to distribute I/O in some embodiments may be made by a scheduler, such as scheduler 690. The schedule may make a decision 820 of energy costs to distribute the I/O 610. For example, the scheduler 690 may assume that the energy costs are lower at night and spin up the spindles at night in order to lower the cost of the replication. As well, the scheduler 690 or 695 may have access to the costs to use electricity at different periods and may calculate an optimal schedule for using electricity and spinning up the drives.

In an alternative embodiment, the scheduler 690 or 695 may make a decision 720 that the Journal streams 635 or 696 on the disk 630 or LUN 694 are getting full and that the other spindles, 640, 650, 660, and 670, s or 698 should be spun up so that the journal I/O may be distributed. As well, the scheduler may be configured by the user, for example to distribute I/O every day from 5 am to 9 am. In fact, the scheduler may consider any number of power or bandwidth saving algorithms in deciding when to spin up or spin down drives.

In reading the above description, persons skilled in the art will realize that there are many apparent variations that can be applied to the methods and systems described. Thus it may be appreciated that, in addition to data replication systems, the optimal journaling policy of the present invention has widespread application to journaling systems including database systems and version control systems.

In the foregoing specification, the invention has been described with reference to specific exemplary embodiments thereof. It will, however, be evident that various modifications and changes may be made to the specific exemplary embodiments without departing from the broader spirit and scope of the invention as set forth in the appended claims. Accordingly, the specification and drawings are to be regarded in an illustrative rather than a restrictive sense.

The methods and apparatus of this invention may take the form, at least partially, of program logic or code (i.e., instructions) embodied in tangible media, such as floppy diskettes, CD-ROMs, hard drives, random access or read only-memory, or any other machine-readable storage medium. When the program code is loaded into and executed by a machine, such as a computer, the machine becomes an apparatus for practicing the invention. When implemented on one or more general-purpose processors, the program code combines with such a processor to provide a unique apparatus that operates analogously to specific logic circuits. As such a general purpose digital machine may be transformed into a special purpose digital machine.

Figure 5:
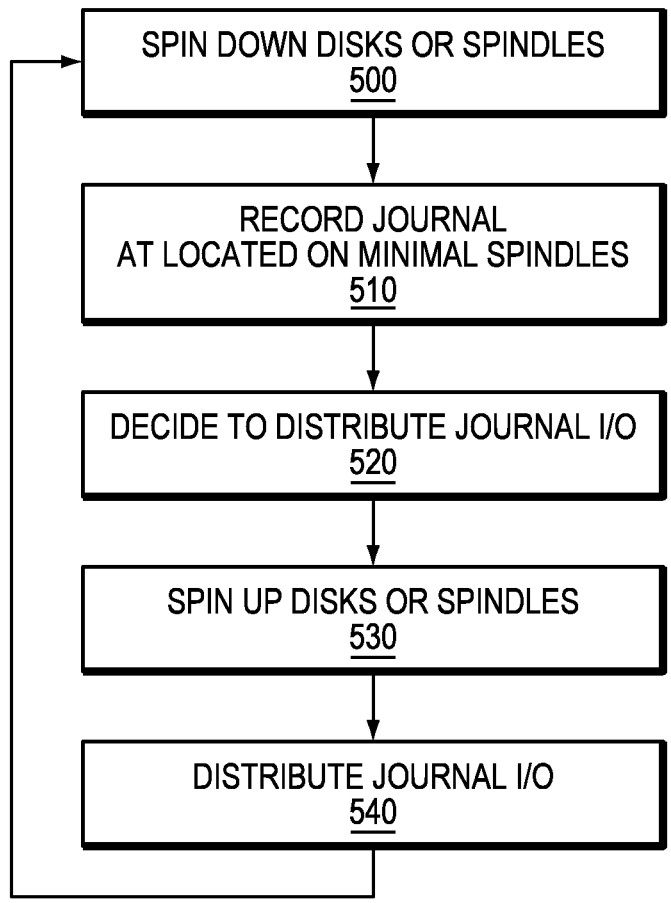
FIG. 5 is an embodiment of the current techniques
Figure 6:
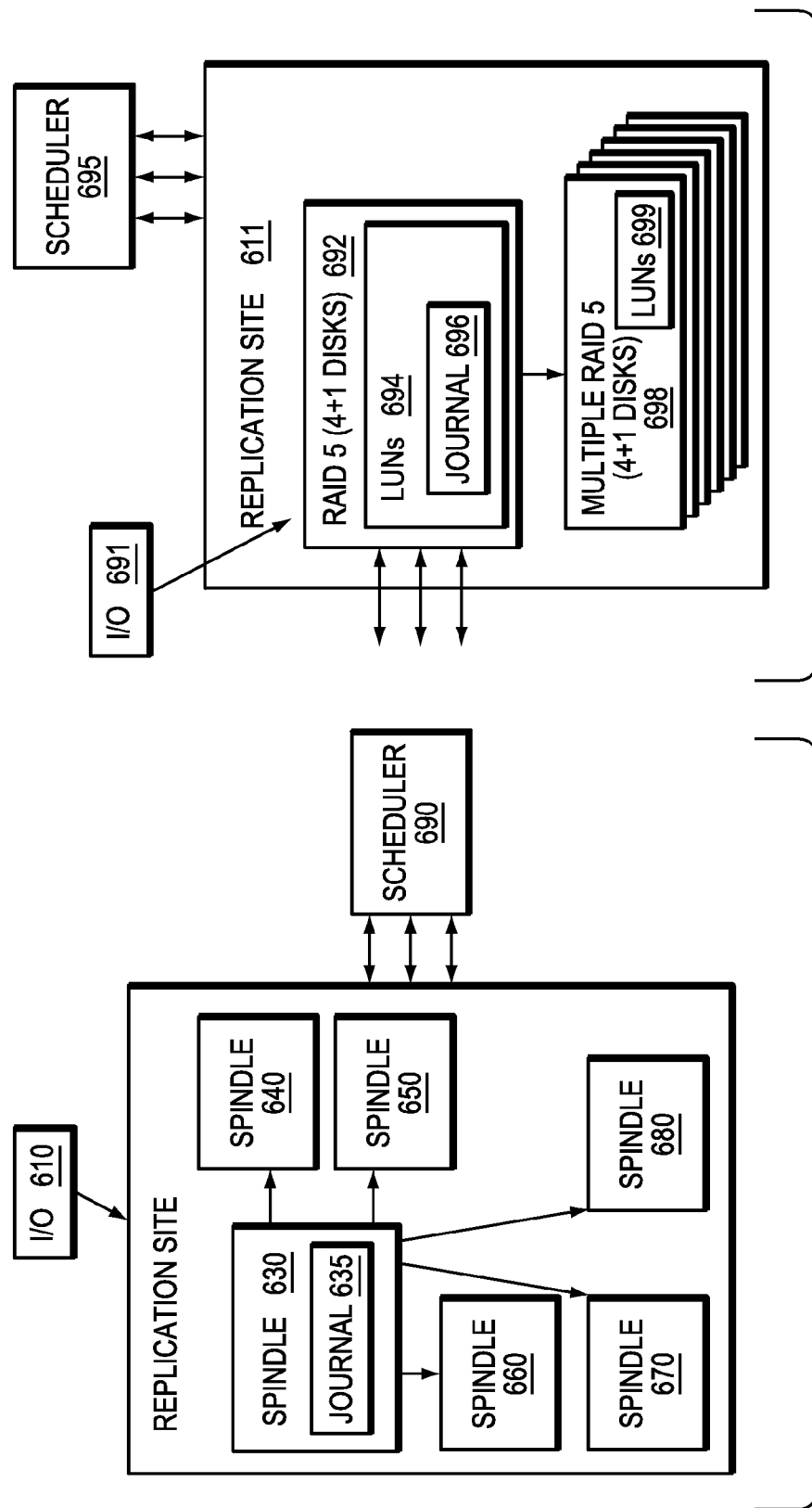
FIG. 6a is an embodiment of a simplified illustration of a journal written on a spindle or a few spindles being distributed to other multiple spindles.
FIG. 6b is an alternative embodiment of a simplified illustration of a journal written on a RAID 5 configuration being distributed to multiple other RAID 5 configurations.
Figure 7:
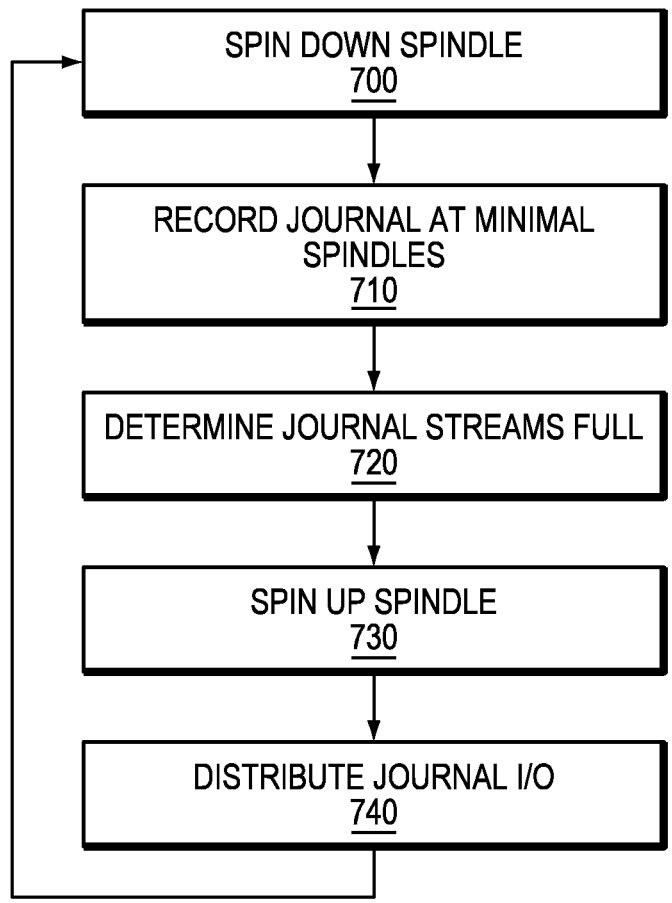
FIG. 7 is an alternative embodiment of the current techniques.
Figure 8:
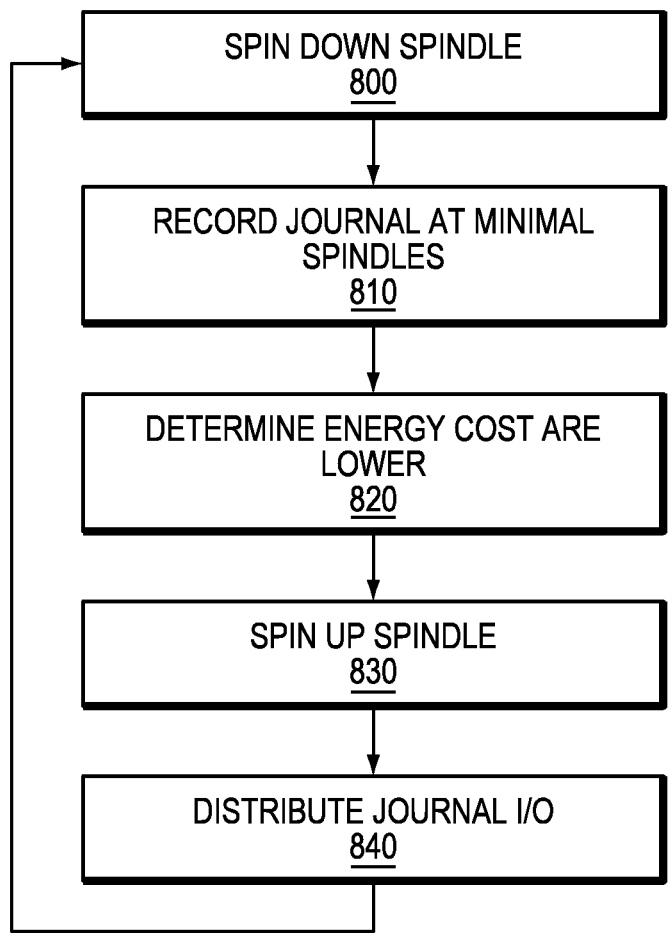
FIG. 8 is an alternative embodiment of the current techniques.
Figure 9:
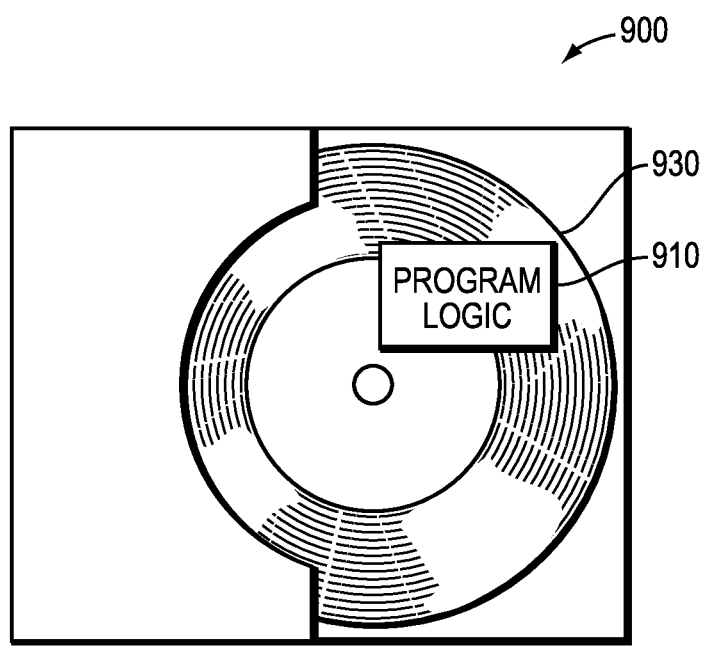
FIG. 9 is an embodiment of the current techniques in program code.

The logic for carrying out the method may be embodied as part of the system described below, which is useful for carrying out a method described with reference to embodiments shown in, for example, FIG. 4 and FIG. 5. For purposes of illustrating the present invention, the invention is described as embodied in a specific configuration and using special logical arrangements, but one skilled in the art will appreciate that the device is not limited to the specific configuration but rather only by the claims included with this specification.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A computer implemented method of managing data replication in a data replication system, the data replication system comprising a journal and a plurality of spindles configured into to store a plurality of Logic Units, each of which has a corresponding Logical Unit Number (LUN), comprising:

selecting a LU using the corresponding LUN to store journal I/O data from the data replication, wherein the selected LU is configured to be a subset of the plurality of spindles;

spinning down the spindles not configured to store the selected LU; wherein the replication system is enabled to spin down more than half of the spindles and the replication system is enabled to store IO directed to the spun down spindles on the subset of spindles;

recording journal I/O on the selected LUN;

determining to distribute the journal IO from the selected LU to the non-selected LUs;

spinning up the spindles including the other LUs which were not selected;

distributing the journal I/O from the selected LU to the other LUs.

2. The method of claim 1 wherein the determination to distribute is based on power costs.

3. The method of claim 1 wherein the determination to distribute is based on the amount of data in the journal.

4. The method of claim 1 wherein the determination to distribute is based on optimizing bandwidth within the data replication system.

5. The method of claim 1 wherein the determination to distribute is based a selection from the group consisting of the time of day, the day of the week, and the date of the year.

6. The method of claim 1 wherein the determination to distribute is made by a scheduler.

7. The method of claim 1 wherein the spindles are grouped into RAID groups and wherein the subset is a RAID group.

8. A system for managing data replication in a data replication system, the data system comprising:
 a journal;
 a plurality of spindles configured into a plurality of Logical Units, each of which has a corresponding Logical Unit Number (LUN); and
 computer-executable program code operating in memory, wherein the computer-executable program code is configured for execution of the following steps:
 selecting a LU using the corresponding LUN to store journal I/O data from the data replication, wherein the selected LU is configured to be a subset of the plurality of spindles;
 spinning down the spindles not configured to store the selected LU; wherein the replication system is enabled to spin down more than half of the spindles and the replication system is enabled to store IO directed to the spun down spindles on the subset of spindles;
 recording journal I/O on the selected LUN;
 determining to distribute the journal IO from the selected LU to the non-selected LUs;
 spinning up the spindles including the other LUs which were not selected;
 distributing the journal I/O from the selected LU to the other.

9. The system of claim 8 wherein the determination to distribute is based on power costs.

10. The system of claim 8 wherein the determination to distribute is based on the amount of data in the journal.

11. The system of claim 8 wherein the determination to distribute is based on optimizing bandwidth within the data replication system.

12. The system of claim 8 wherein the determination to distribute is based a selection from the group consisting of the time of day, the day of the week, and the date of the year.

13. The system of claim 8 wherein the determination to distribute is based on the size of the journal.

14. A program product for managing data replication in a data replication system, the data replication system comprising a journal and a plurality of spindles configured into a plurality of Logical Units, each of which has a corresponding Logical Unit, the program product comprising:
 a computer-readable storage medium encoded with computer-executable program code enabling:
 selecting a LU using the corresponding LUN to store journal I/O data from the data replication, wherein the selected LU is configured to be a subset of the plurality of spindles;
 spinning down the spindles not configured to store the selected LU; wherein the replication system is enabled to spin down more than half of the spindles and the replication system is enabled to store IO directed to the spun down spindles on the subset of spindles;
 recording journal I/O on the selected LUN;
 determining to distribute the journal IO from the selected LU to the non-selected LUs;
 spinning up the spindles including the other LUs which were not selected;
 distributing the journal I/O from the selected LU to the other LUs.

15. The program product of claim 14 wherein the determination to distribute is based on power costs.

16. The program product of claim 14 wherein the determination to distribute is based on the amount of data in the journal.

17. The program product of claim 14 wherein the determination to distribute is based on optimizing bandwidth within the data replication system.

18. The program product of claim 14 wherein the determination to distribute is based a selection from the group consisting of the time of day, the day of the week, and the date of the year.

19. The program product of claim 14 wherein the determination to distribute is made by a scheduler.

20. The system of claim 8 wherein the determination to distribute is made by a scheduler.

21. The program product of claim 14 wherein the determination to distribute is based on the size of the journal.

* * * * *